(12) United States Patent
Al-Naseem

(10) Patent No.: US 8,437,159 B2
(45) Date of Patent: May 7, 2013

(54) CAM-CONTROLLED ELECTROMECHANICAL ROTARY POWER INVERTER

(75) Inventor: Osama Abdulrahman Al-Naseem, Safat (KW)

(73) Assignee: Kuwait University, Safat (KW)

( * ) Notice: Subject to any disclaimer, the term of this patent is extended or adjusted under 35 U.S.C. 154(b) by 394 days.

(21) Appl. No.: 12/902,968

(22) Filed: Oct. 12, 2010

(65) Prior Publication Data

US 2012/0087166 A1 Apr. 12, 2012

(51) Int. Cl.
H02M 7/60 (2006.01)

(52) U.S. Cl.
USPC .......................................................... 363/109

(58) Field of Classification Search ............... 363/32, 363/109
See application file for complete search history.

(56) References Cited

U.S. PATENT DOCUMENTS

| 419,660 A | 1/1890 | Gutmann |
|---|---|---|
| 1,703,242 A | 2/1929 | Kukel |
| 1,960,976 A | 5/1934 | Parvin |
| 3,162,833 A | 12/1964 | Mac Lain |
| 3,331,007 A | 7/1967 | Milner et al. |
| 3,373,339 A | 3/1968 | Birman |
| 3,629,688 A | 12/1971 | Fink |
| 4,012,641 A | 3/1977 | Brickerd, Jr. et al. |
| 4,194,239 A | 3/1980 | Jayaram et al. |
| 4,717,995 A | 1/1988 | Garcia |
| 5,633,792 A | 5/1997 | Massey |
| 6,081,082 A | 6/2000 | Kim et al. |
| 2012/0087166 A1 * | 4/2012 | Al-Naseem .................. 363/109 |

* cited by examiner

Primary Examiner — Jeffrey Sterrett
(74) Attorney, Agent, or Firm — Richard C. Litman

(57) ABSTRACT

The cam-controlled electromechanical rotary power inverter converts a plurality of DC source voltages to an AC power output by an electromechanical mechanism that includes a rotating assembly of cams intermittently contacting a series of brushes connected to the DC source voltages to sequentially add the DC voltages and then sequentially subtract the DC voltages over 360° of rotation of the cam assembly. In this manner, the inverter provides multilevel, e.g., seven discrete voltage levels, which are distributed as output sequentially in an additive manner and then a subtractive mariner to generate nearly sinusoidal voltages. Repeating sequences of brushes and cams over three 120° intervals allows for 3-phase AC voltage output from the inverter.

3 Claims, 17 Drawing Sheets

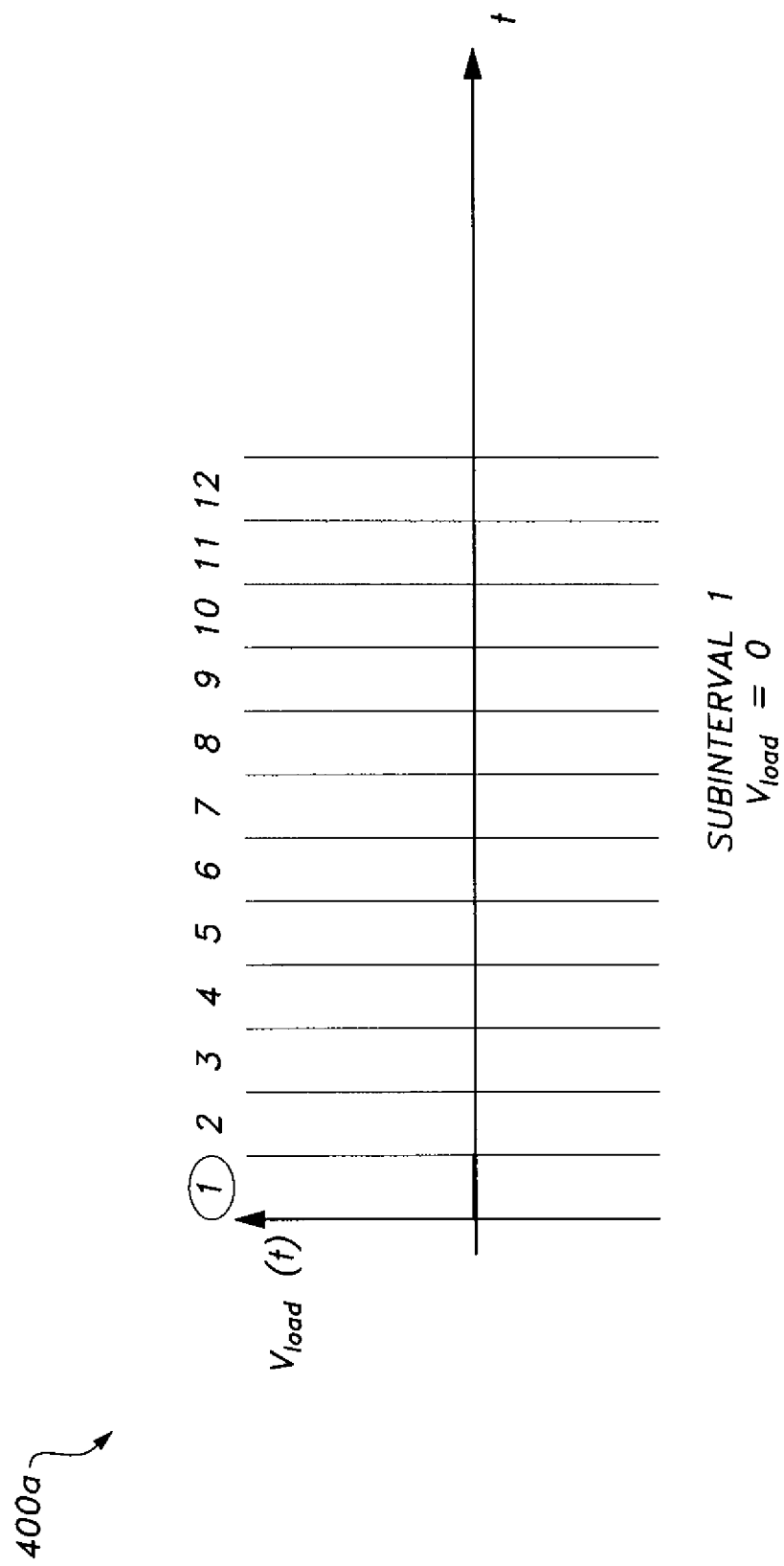

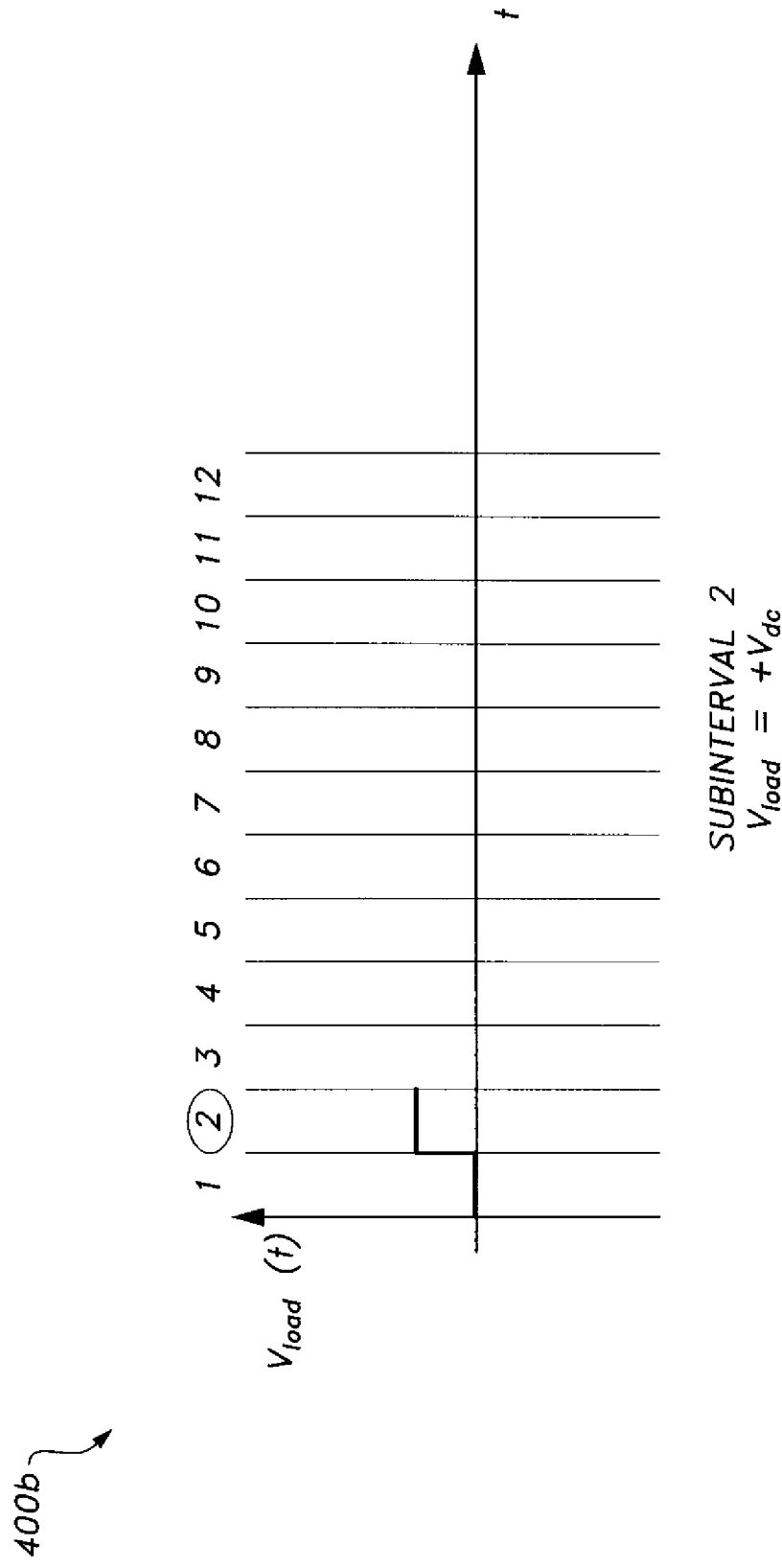

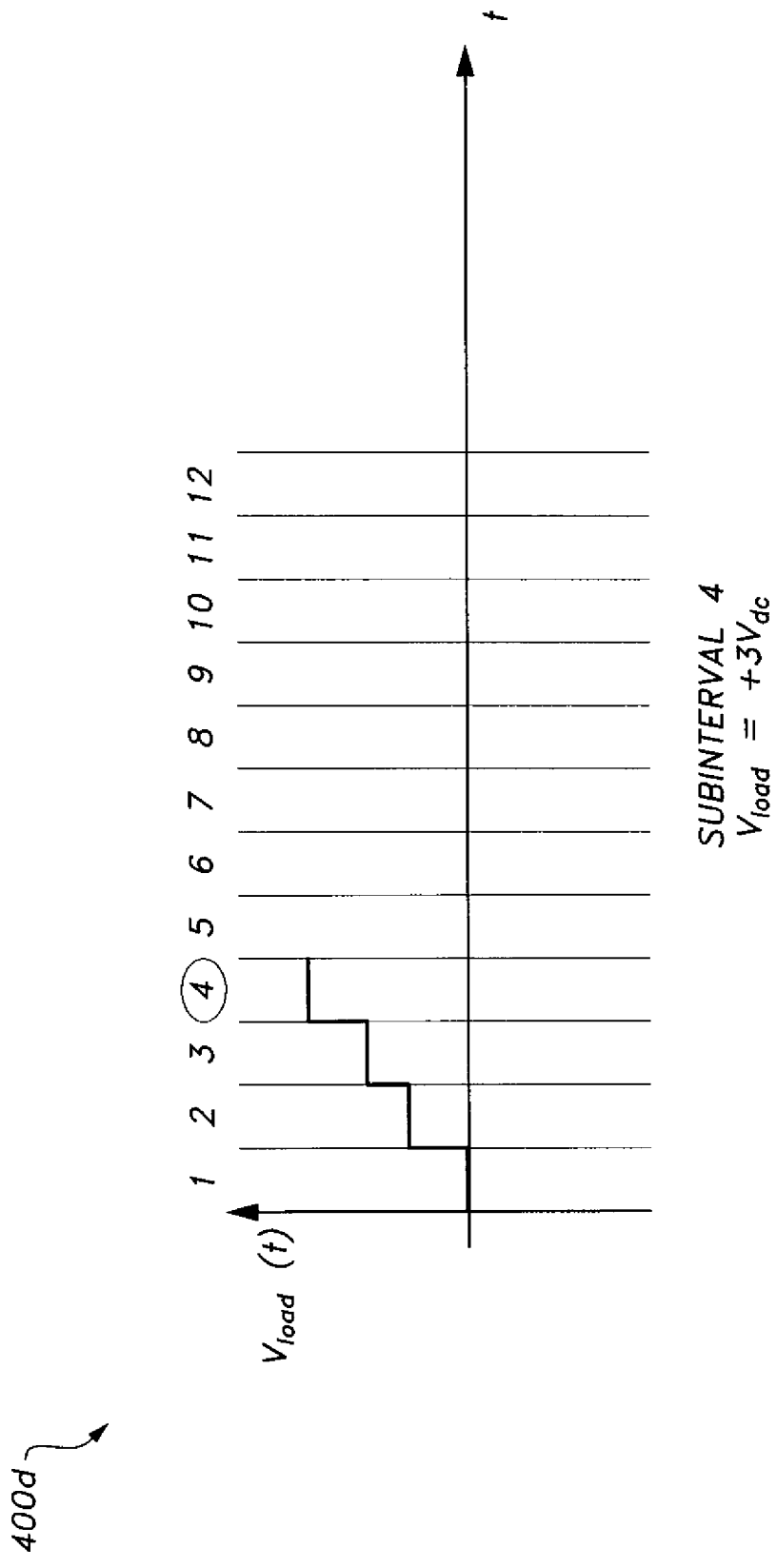

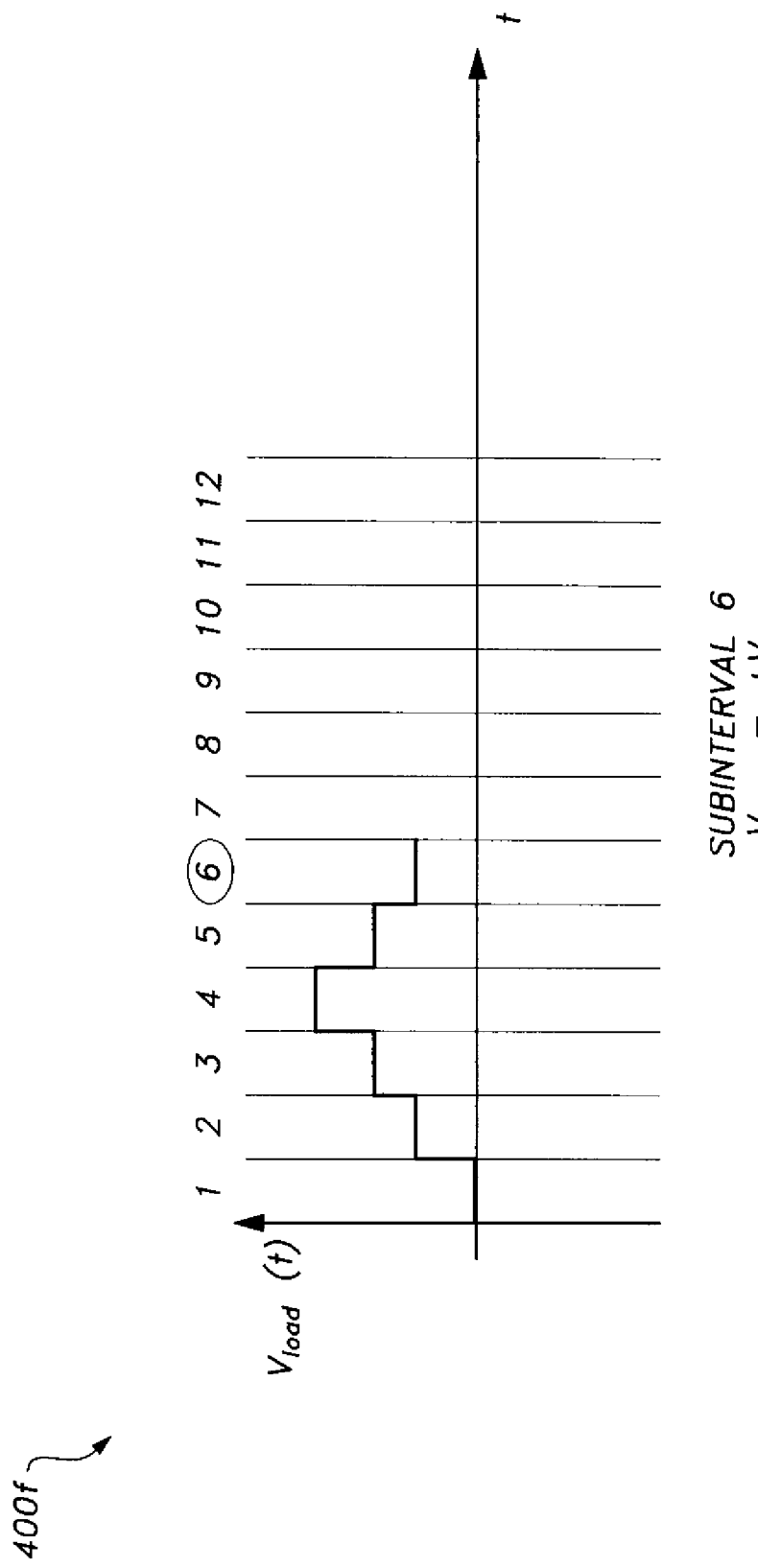

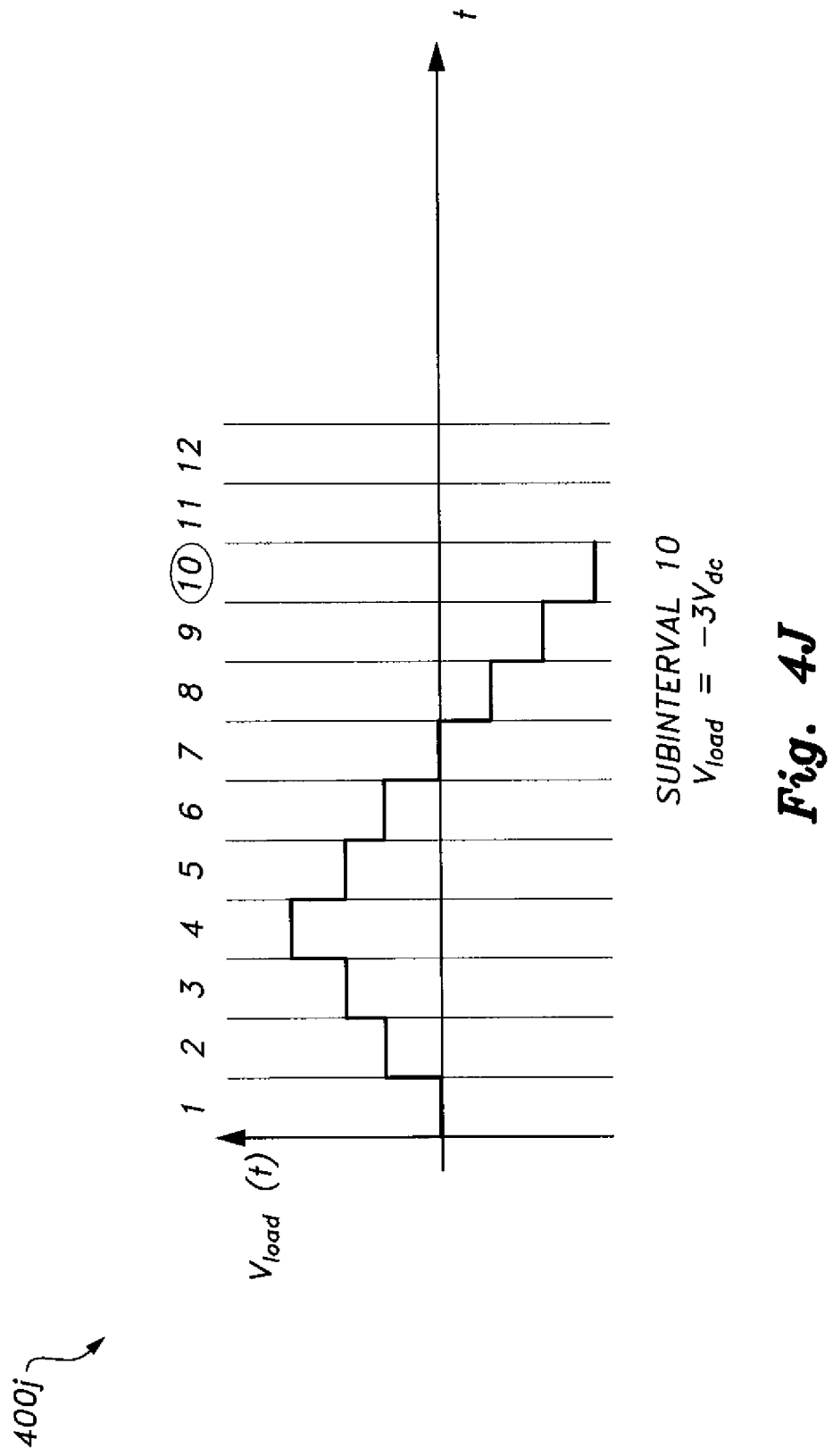

CAM-CONTROLLED ELECTROMECHANICAL ROTARY POWER INVERTER

BACKGROUND OF THE INVENTION

1. Field of the Invention

The present invention relates to power inverters, and particularly to a cam-controlled electromechanical rotary power inverter for changing direct current to alternating current.

2. Description of the Related Art

Generally, an inverter is an apparatus for inverting a DC power source into an AC power source. Semiconductor devices are often used in circuits that convert a DC power source to AC power.

However, since it is often necessary to provide a plurality of expensive semiconductor devices in the power inverter in order to output a desired voltage, the manufacturing cost is increased.

Another problem is that semiconductor components use up a substantial portion of the power generated, thereby limiting the lifetime of a battery-type DC power source.

Moreover, since semiconductor devices generate excessive heat, additional cooling fins and heat dissipation means must be employed in the inverter design. It would therefore be desirable to provide a power inverter that does not rely heavily on semiconductor devices for converting DC voltage to AC voltage.

Thus, a cam-controlled electromechanical rotary power inverter solving the aforementioned problems is desired.

SUMMARY OF THE INVENTION

The cam-controlled electromechanical rotary power inverter converts a plurality of DC source voltages to an AC power output via electromechanical means, which includes a rotating assembly of cams that periodically and slidably contact a series of brushes connected to the plurality of DC voltage sources to sequentially add the DC voltages and then sequentially subtract the DC voltages over 360° of rotation of the cam assembly. In this manner, the inverter provides multilevel, e.g., seven discrete voltage levels, which are distributed as output sequentially in an additive manner and then a subtractive manner to generate nearly sinusoidal voltages.

These and other features of the cam-controlled electromechanical rotary power inverter will become readily apparent upon further review of the following specification and drawings.

BRIEF DESCRIPTION OF THE DRAWINGS

FIGS. 4A, 4B, 4C, 4D, 4E, 4F, 4G, 4H, 4I, 4J, 4K, and 4L are plots showing output voltage at successive angular intervals in a cycle of the cam-controlled electromechanical rotary power inverter according to the present invention.

Similar reference characters denote corresponding features consistently throughout the attached drawings.

DETAILED DESCRIPTION OF THE PREFERRED EMBODIMENTS

Figure 1:
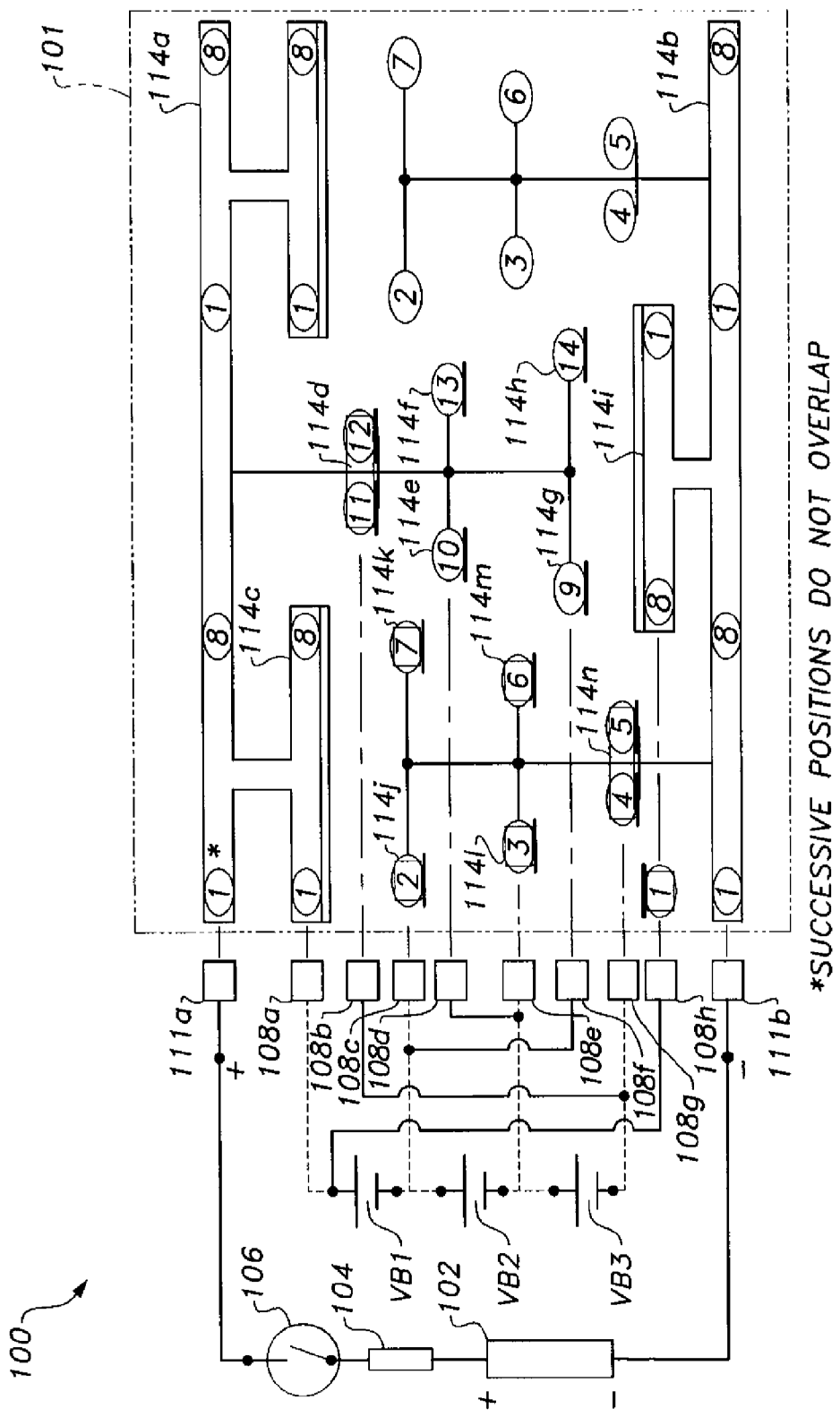
FIG. 1 is a schematic diagram of a cam-controlled electromechanical rotary power inverter according to the present invention.

The cam-controlled electromechanical rotary power inverter is a DC power inverter that provides multilevel, e.g., seven discrete voltage levels distributed as output sequentially in an additive manner and then a subtractive manner to generate near sinusoidal voltages. The inverter 100 uses no semiconductor devices. It does not generate pulse width modulated waveforms that need further filtering. It does not generate square waveforms that need further filtering.

Referring to FIGS. 1-3B, the cam-controlled electromechanical rotary power inverter 100 comprises an electrically insulated shaft or elongate cylindrical member 101 that has a plurality of arcuately edged, electrically conductive cams 114c-114n extending radially from portions of the cylindrical member 101 at predetermined angular subintervals of a 360° rotation of the cylindrical member 101.

A first 360° electrically conductive rotor 114a is coaxially affixed to cylindrical member 101 near the top end portion of the cylinder 101.

A second 360° electrically conductive rotor is coaxially affixed to the cylinder 101 proximate the bottom end portion of the cylinder 101.

A first predetermined sequence of the arcuately edged, electrically conductive cams 114c through 114h is electrically connected to the first 360° electrically conductive rotor 114a. A second predetermined sequence of the arcuately edged, electrically conductive cams 114i through 114n is electrically connected to the second 360° electrically conductive rotor 114b. Cams may be connected to either the top load distribution rotor 114a or the bottom load distribution rotor 114b, depending on the magnitude and polarity of voltage desired at the phase angle, i.e., the angular position, represented by the cams being connected.

As shown in FIG. 1, the electromechanical connections of the exemplary cam-controlled electromechanical rotary power inverter 100 include a series circuit connection of a load 102, a fuse 104 and a circuit breaker 106 that terminates at power distribution brushes 111a and 111b. A battery VB1 positive terminal is connected to brush 108a and brush 108h. The negative terminal of the battery VB1 is connected to brush 108c and brush 108f. The positive terminal of a second battery VB2 is connected to in series to battery VB1, and is also connected to brush 108f. The negative terminal of battery VB2 is connected to brush 108d and brush 108e. The positive terminal of a third battery VB3 is connected in series to battery VB2, and therefore to brushes 108d and 108e. The negative terminal of battery VB3 is connected to brush 108g, and also to brush 108b. The cams 114c-114h are connected to the top rotor 114a and the cams 114i-114n are connected to the bottom rotor 114b by copper slip conductors (which are always below the brushes level to avoid contact with any brush) in the positive voltage and negative voltage numerically designated patterns, positions 1 through 14 over a 360° circumference of rotation, as shown in FIG. 1. Positions 1, 2, 3, 4, 5, 6, 7, and 8 occur in the positive half-cycle of the output AC voltage waveform. Positions 8, 9, 10, 11, 12, 13, 14, and 1 occur in the negative half-cycle of the output AC voltage waveform.

The electrically conducting copper cams 114c-114n are disposed in an arrangement with the rotors 114a-114b that is designed to function in a similar fashion as slip rings and commutator segments. The exemplary multilevel rotary inverter 100 includes the three DC voltage sources VB1-VB3, the ten carbon brushes 111a-111b, 108a-108h, and the fourteen rotating contact surfaces, which include rotors 114a-114b and cams 114c-114n. The number of brushes used and the number of levels in which the inverter synthesizes are related to the number of DC sources as follows: the number of levels is 2n+1, and the number of brushes is 2(n+2), where n is the number of DC voltage sources.

Figure 3A:
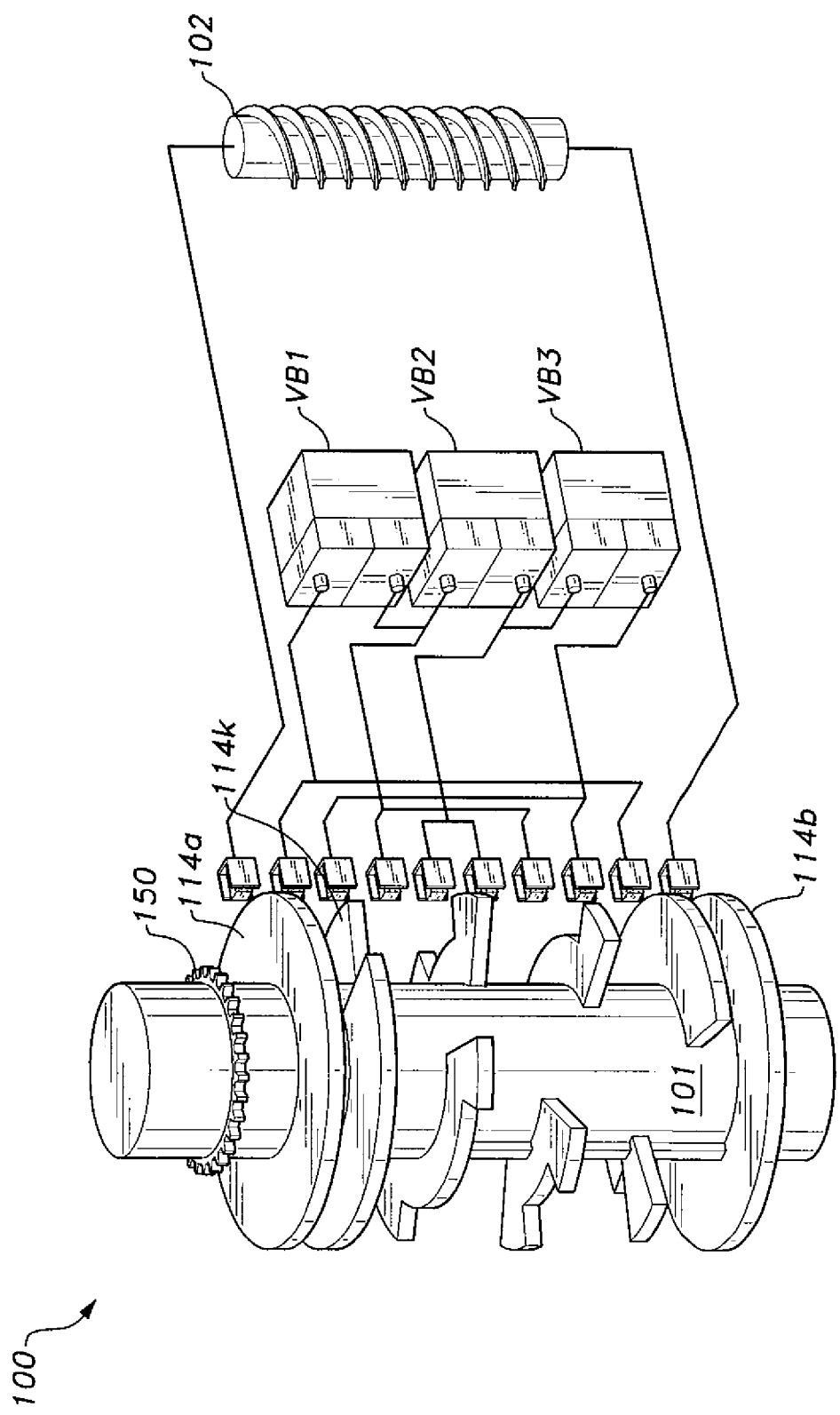
FIG. 3A is a perspective view of a cam-controlled electromechanical rotary power inverter according to the present invention in a first angular position.
Figure 3B:
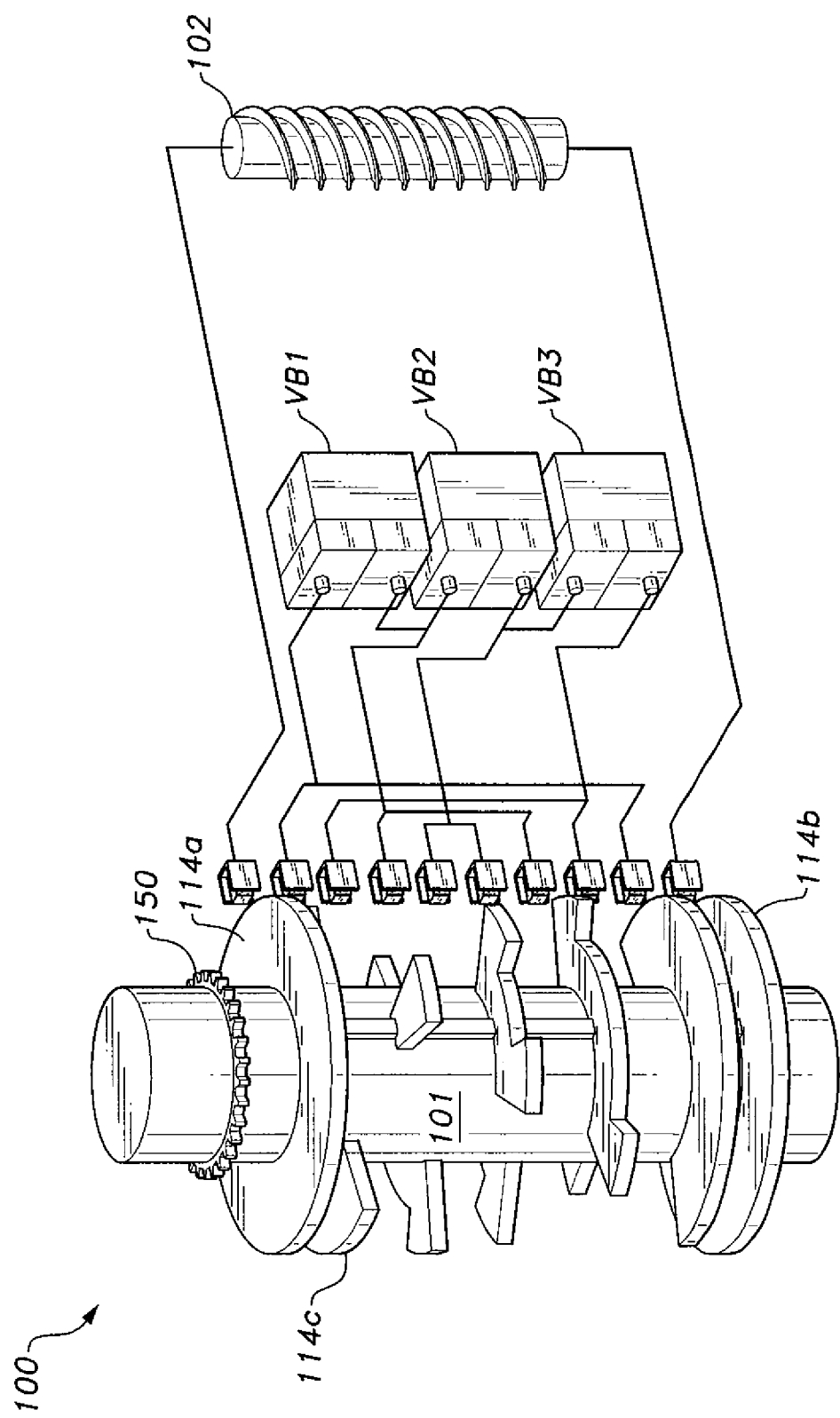
FIG. 3B is a perspective view of the cam-controlled electromechanical rotary power inverter of FIG. 3A in a second angular position.
Figure 4C:
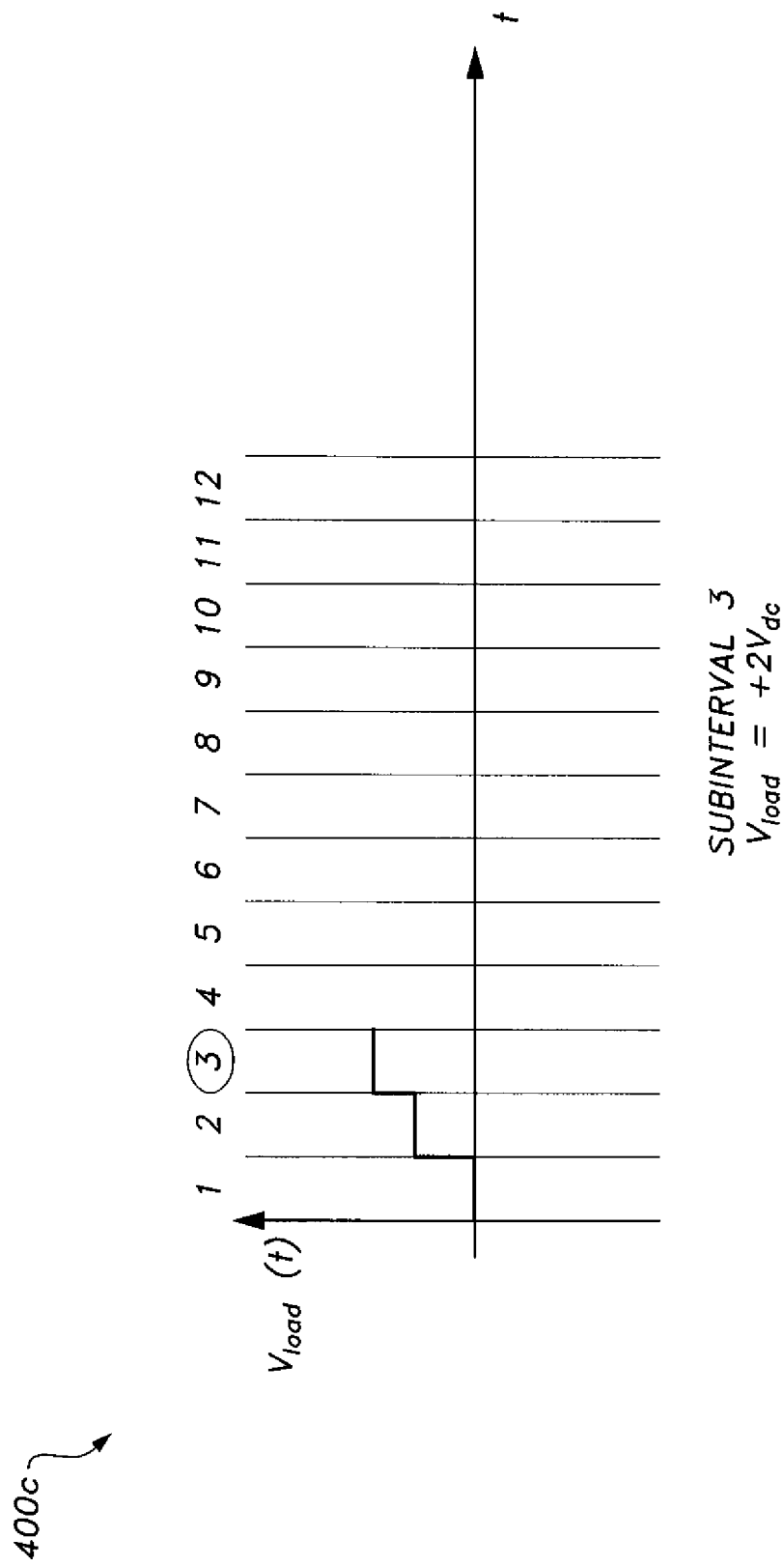
Figure 4E:
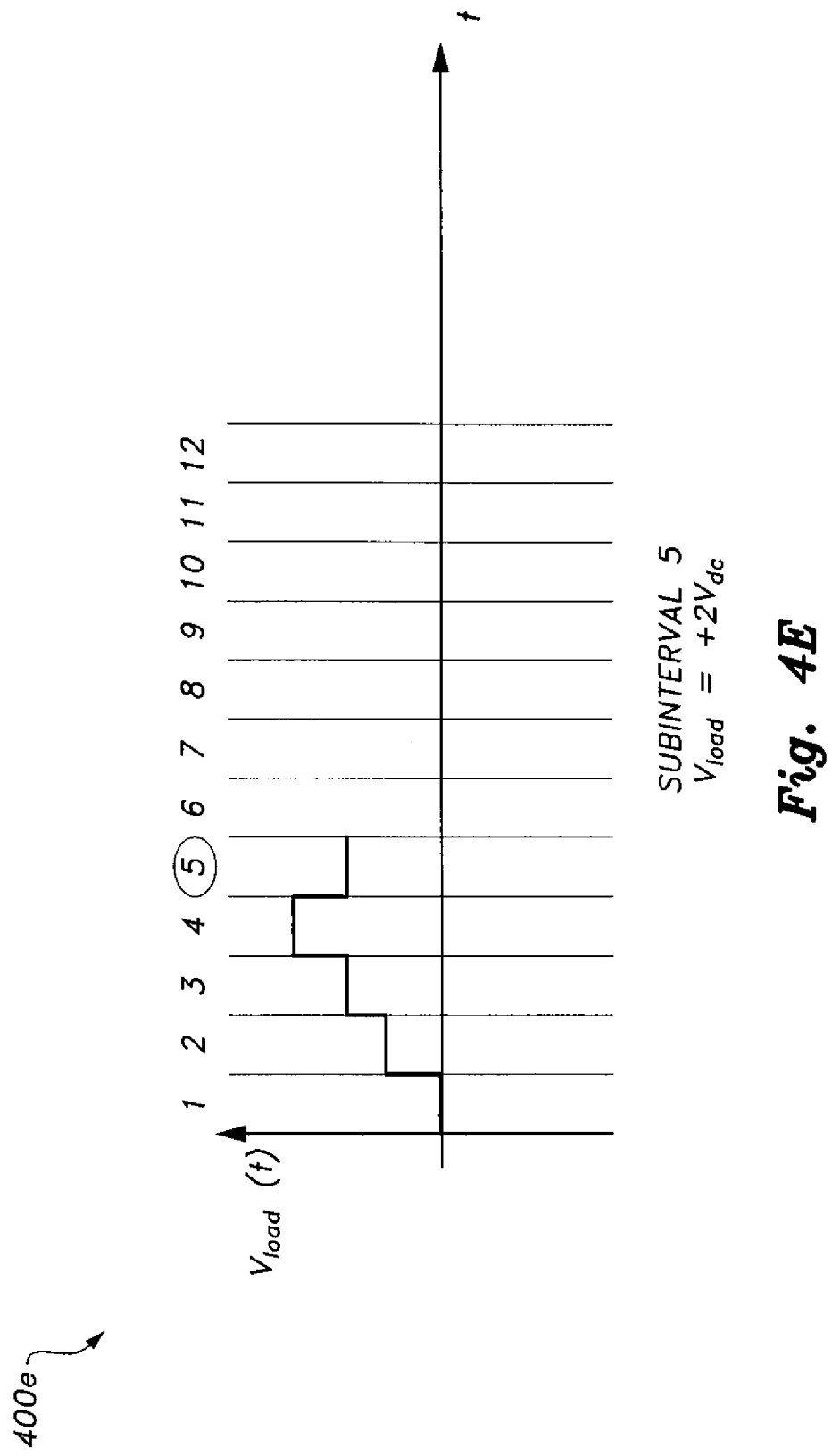
Figure 4G:
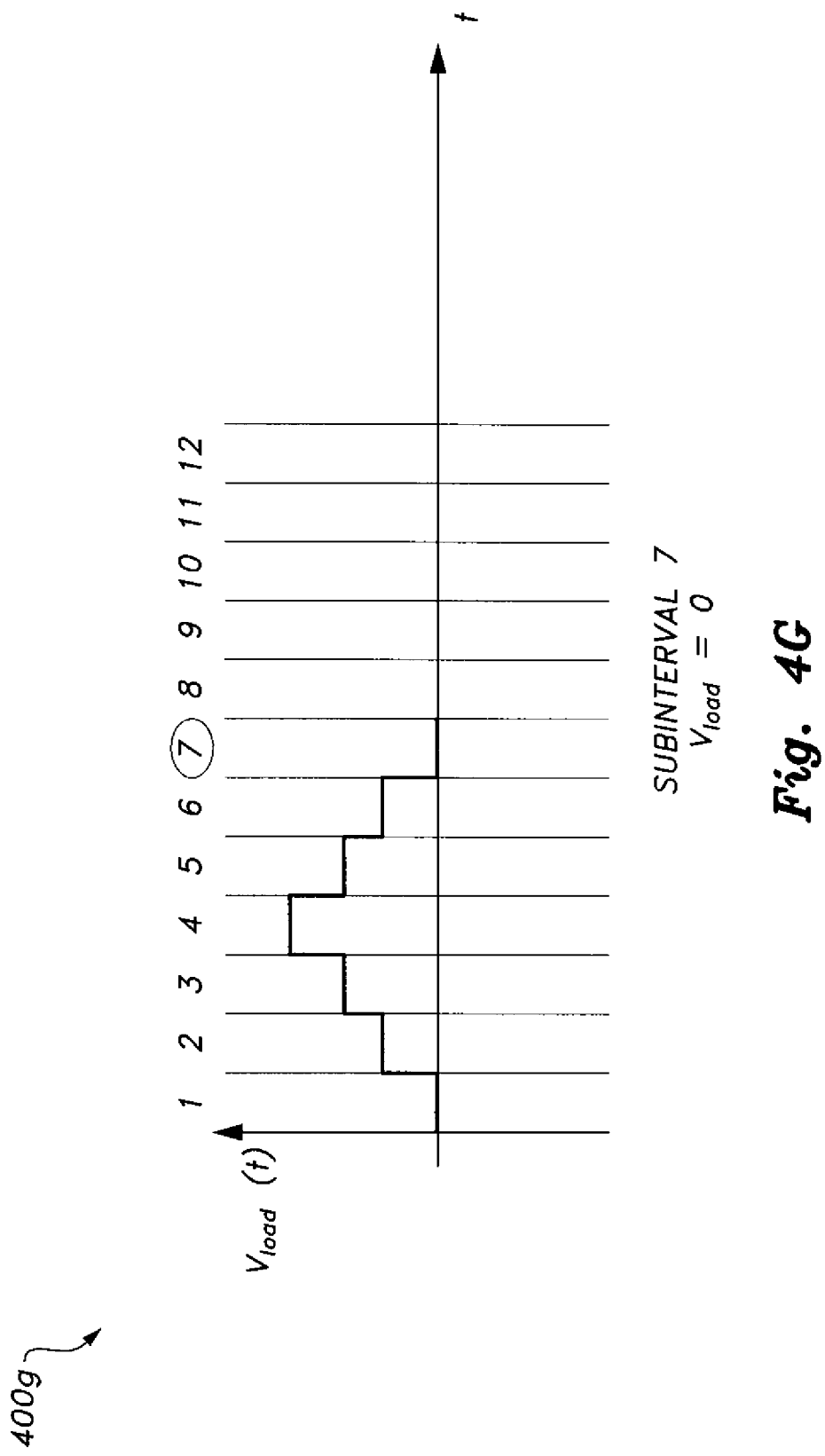
Figure 4H:
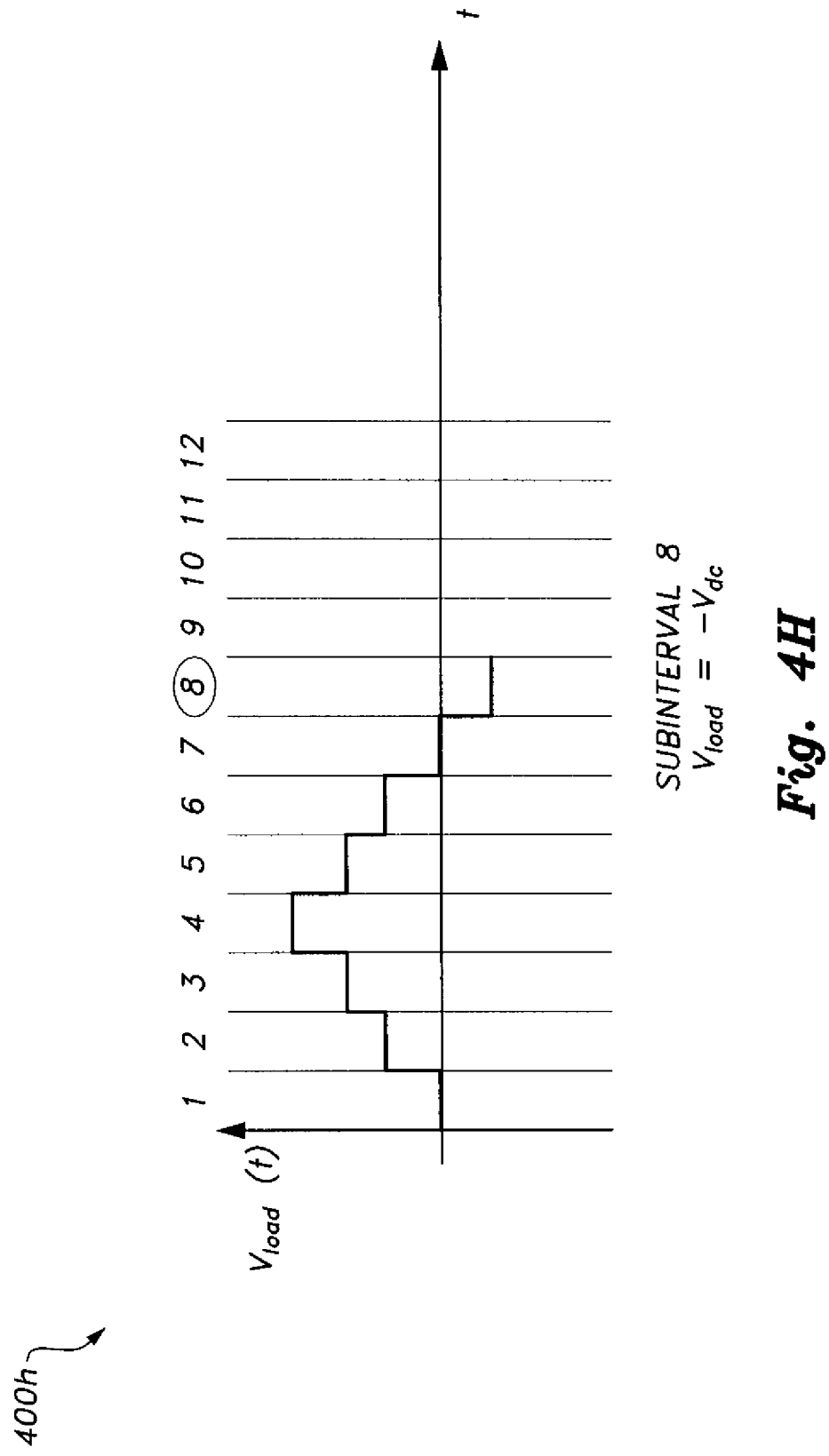
Figure 4I:
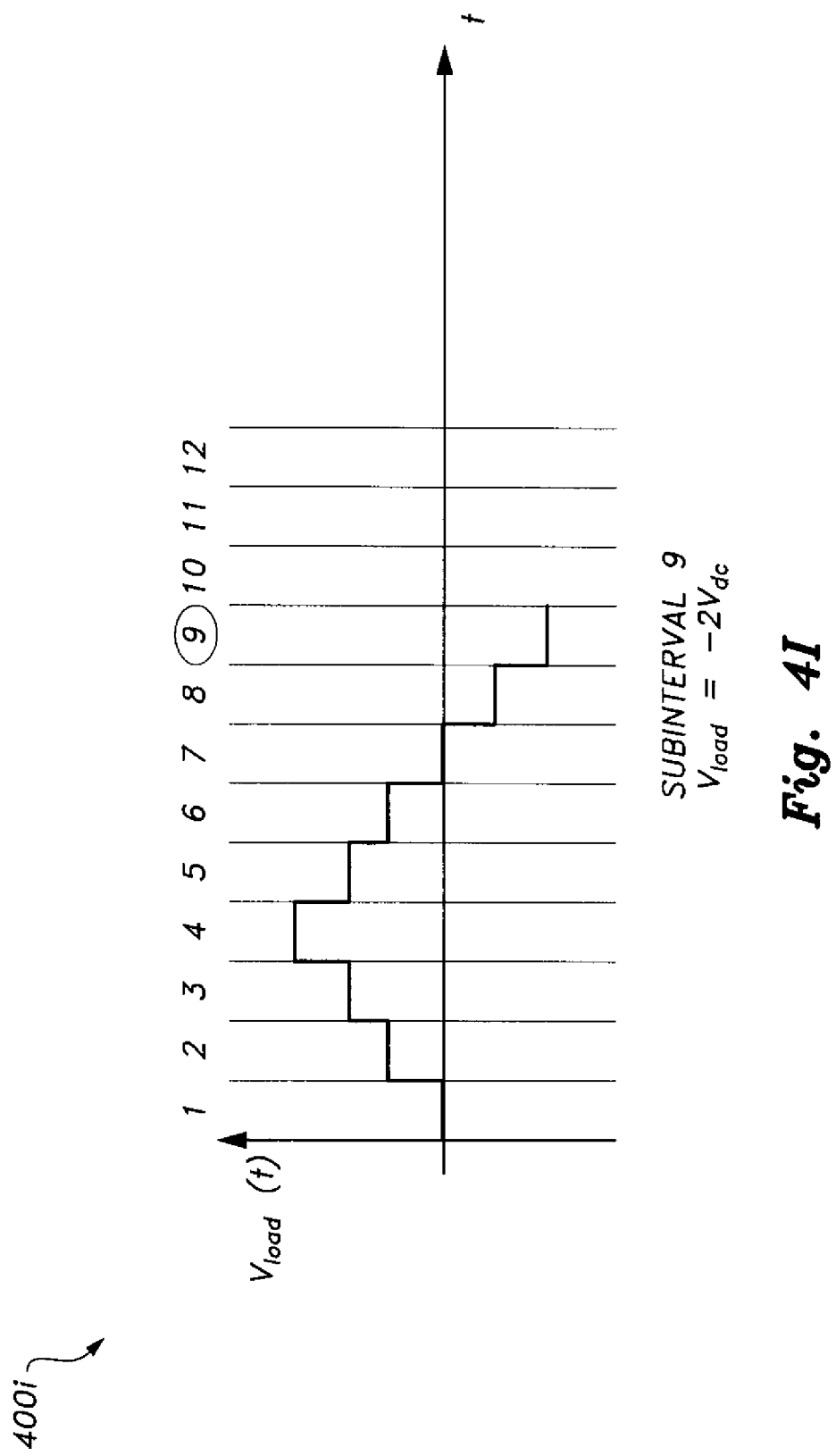
Figure 4K:
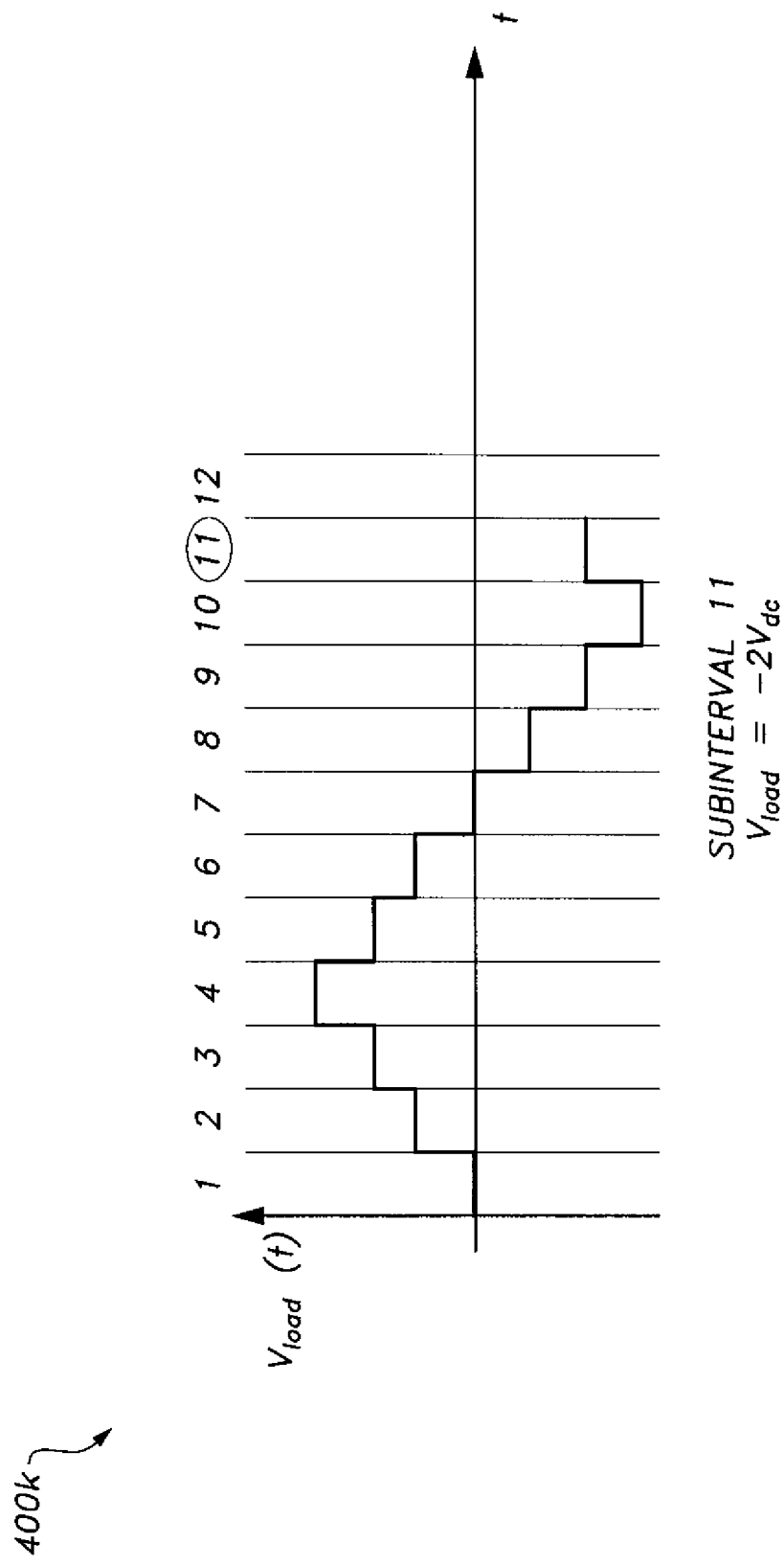
Figure 4L:
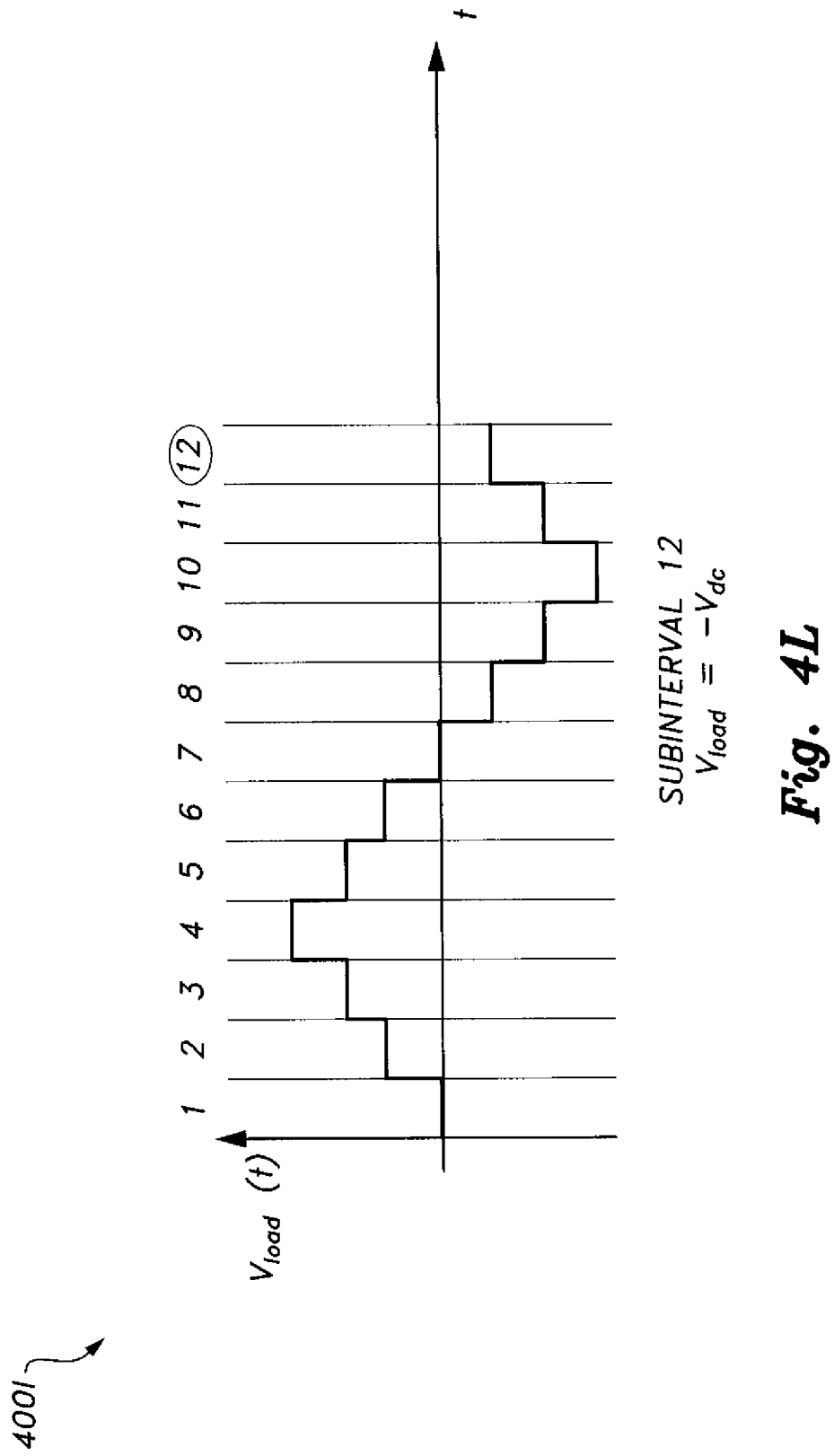

As shown in FIGS. 3A-3B electrical brush conductors 108a through 108h are rigidly stacked in line at a predetermined angular position of the rotating assembly of cylinder 101. Each of brushes 108a through 108h is in planar alignment with at least one respective cam to allow for sliding electromechanical contact against the respective cam when the cam rotates around to the angular position of the brush. The two load brushes 111a, 111b are in continuous contact with the power distribution rotors 114a and 114b, respectively.

Batteries VB1, VB2, and VB3 provide a plurality of DC input voltages, each battery being connected to a corresponding pattern of the brush conductors 108a through 108h. The configuration of the inverter 100 allows for a sequence of output voltages to be generated for consumption by load 102 upon rotation of the cylinder 101.

Rotation of the cylinder 101 and the attached cams 114c through 114n causes brushes 108a through 108h to periodically contact the electrically conductive cams 114c-114n in a patterned sequence of dwell times that causes sequential addition of the DC input voltages provided by batteries VB1, VB2, and VB3 for distribution to the load 102 over the first 180° of rotation, and sequential subtraction (i.e., selective removal and polarity reversal) of the DC input voltages provided by batteries VB1, VB2, and VB3 for distribution to the load 102 over the second 180° of rotation, thereby distributing an Alternating Current (AC) output voltage to the load 102 over 360° of rotation of the rotating cylindrical member 101. Relative dwell time of the sliding contact between any specific brush and cam is determined by the arc length of that particular arcuate cam member. Thus the arc length of each cam is a design parameter determined by duration in time (or phase) that it should be in contact with its associated brush through rotation of the cylinder 101.

Figure 2:
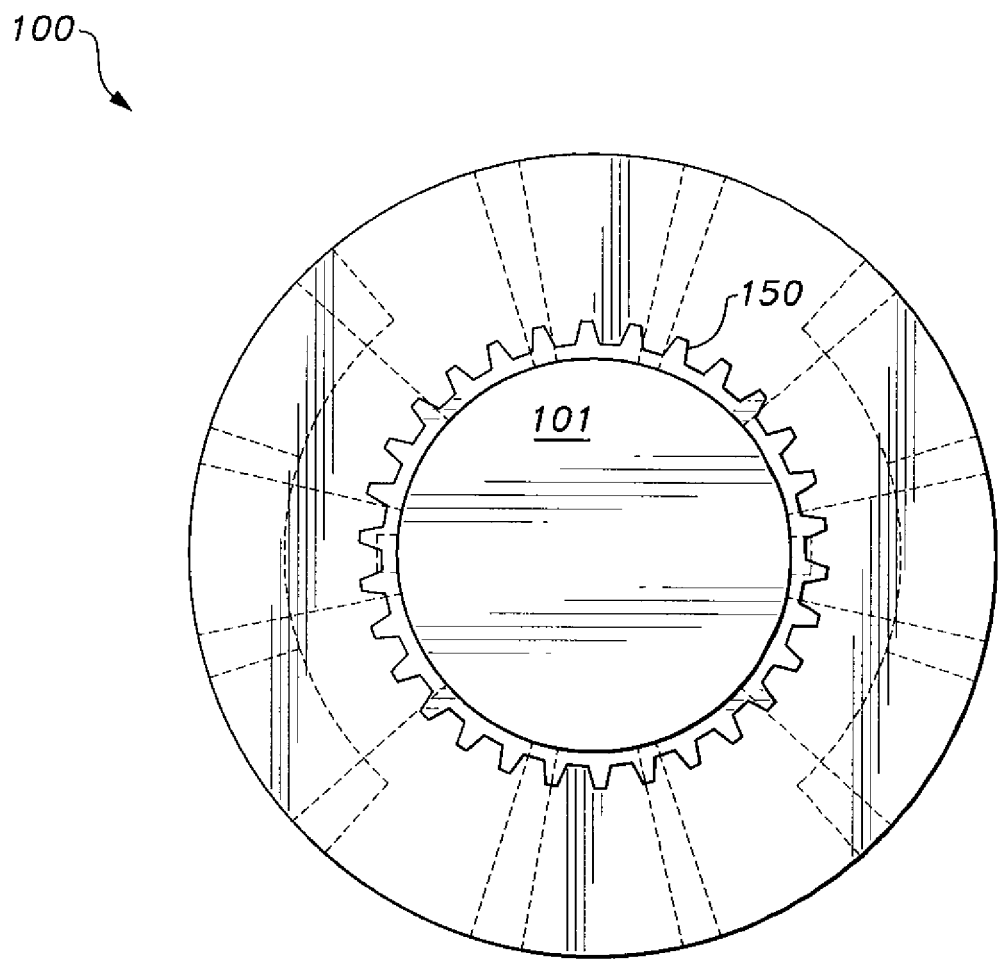
FIG. 2 is a top view of a cam-controlled electromechanical rotary power inverter according to the present invention.
Figure 5:
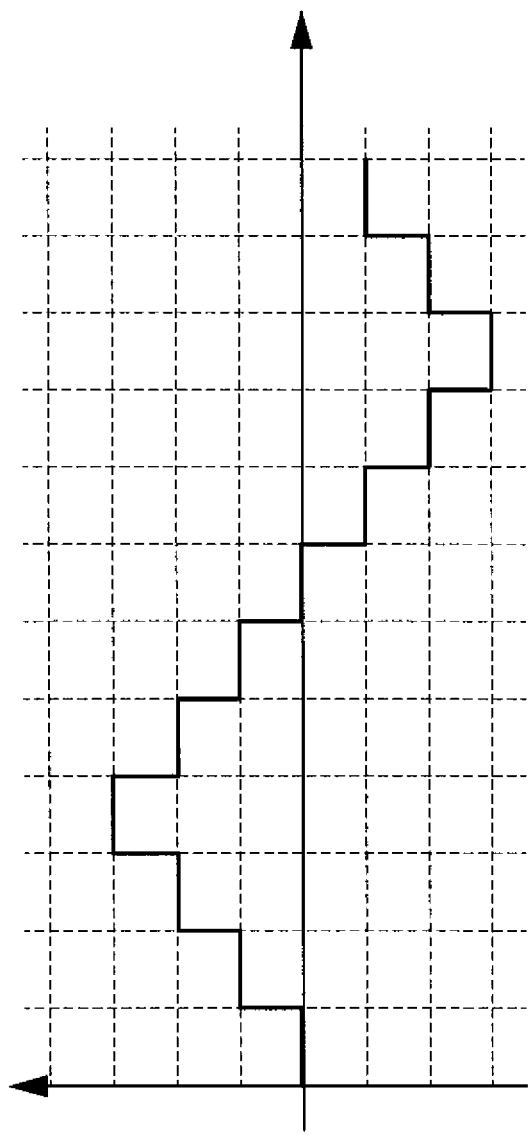
FIG. 5 is a plot showing an ideal output waveform of the cam-controlled electromechanical rotary power inverter according to the present invention.

The brushes 108a-108h, along with the cams 114c-114n, control the voltage output seen by a load due to construction and arrangement similar to slip rings and commutator segments of different lengths to thereby allow for multilevel, virtually sinusoidal voltage generation. It should be understood that the aggregate polarity of the cam connections to load distribution rotors 114a and 114b at any given phase angle allows for bidirectional current flow of rotary inverter 100. The rotary inverter 100 does not need any semiconductor devices (e.g., diodes). While a plurality of brushes is used in the rotary inverter 100, preferably ten brushes are used. As shown in FIG. 2, a mechanical gear 150 is disposed on a top end of the cylinder 101 and can engage a corresponding gear of a prime mover, such as an electrical motor, turbine, or the like. As shown in FIGS. 4A through 4L, the operating voltage subintervals of the rotary inverter 100 can be divided into twelve discrete 30° segments, as shown in plots 400a, 400b, 400c, 400d, 400e, 400f, 400g, 400h, 400i, 400j, 400k and 400l, respectively. As shown in FIG. 5, plot 500 shows the resultant ideal seven-level output voltage waveform synthesized by the inverter 100.

This cam-controlled electromechanical rotary power inverter 100 is a new class of DC-to-AC inverter capable of single and/or polyphase voltage inversion. It provides an electromechanical (non-magnetic, non-electronic) method to generate three-phase AC voltage from a DC supply. Unlike the old generation rotary inverter, which uses induction principles, the inverter 100 is fully non-magnetic and uses brushes and cams similar to slip rings and commutator segments to synthesize multilevel three-phase voltages from a DC voltage source. The inverter 100 can be driven by an external DC motor or other prime mover to rotate the body of the inverter. The input power to the inverter 100 comes from a multivoltage level source DC supply, which is connected to the brushes. The DC motor or prime mover is merely a means to provide the necessary rotation to synthesize the three-phase AC outputs.

Three-phase voltages are synthesized as multilevel waveforms. Seven levels of a single phase are shown in plots 400a-400l of FIGS. 4A-4L. Multilevel waveforms are different from pulse-width-modulated waveforms, which need further filtering to remove high frequency switching effects. By increasing the number of levels, the inverter 100 can generate nearly sinusoidal AC waveforms without the need for additional filters.

This approach is also an alternative to the majority of power electronic inverters in current use nowadays that have gate-base controlled transistors. There is no need for transistors and their complex control circuitry. Failures due to semiconductor stresses are not anticipated because no semiconductors are required in the inverter 100. The inverter 100 is low cost and has less temperature and dust sensitivity, since the inverter 100 does not rely on sensitive electronic logic control circuitry. The lifetime is expected to be longer than a conventional voltage-source inverter. The multilevel voltage synthesis design allows the inverter 100 to be capable of giving better sinusoidal approximation and higher voltage levels.

The rotary inverter 100 synthesizes multilevel waveforms, which pulse-width modulated waveform synthesis cannot do, and hence does not need further filtering. Spurious waveforms, e.g., harmonics, may be eliminated by adjusting the number & length of the cams. Being applicable to renewable energy supplies (i.e. solar, wind, etc.), a wind turbine may be coupled to the mechanical gear 150 for the purpose of driving (i.e., rotating) the inverter 100. The energy captured in a wind generator may be rectified and used as the DC source for the inverter 100.

AC output voltage is adjustable by adjusting the number & length of the cams. Automatic control may be applied by controlling the speed of the driving dc motor and by automating the addition or removal of the cams by use of pneumatic or electrical actuators.

The length of the cams may also be automatically controlled by the use of pneumatic or electrical actuators. Bidirectional current flow allows for leading and lagging power factor loads. The inverter 100 does not consume reactive power. Moreover, there is no commutation or overlap delay, and there is zero extinction angle. Hence, the output voltage levels are stable. The device does generate high flux, yet does not need a core, like other electric machinery and transformers. The inverter 100 has no windings and no iron core, as found in electric motors. The inverter 100 generates low EMI interference, since it does not use semiconductor devices.

Additionally, the inverter 100 may be easily extended to three-phase applications by adding two additional phases maintaining a 120° phase shift. Prime mover output torque is constant, even as the inverter output power varies. This is because the purpose of the prime mover is to rotate the cylinder 101 only. In other words, the output power does not contain power from the power mover. It only contains power from the DC voltage source (e.g., batteries VB1, VB2, and VB3). However, the prime mover output torque will increase as the output voltage frequency increases.

It is to be understood that the cam-controlled electromechanical rotary power inverter is not limited to the embodiment described above, but encompasses any and all embodiments within the scope of the following claims.

I claim:

1. A cam-controlled electromechanical rotary power inverter, comprising:
   a rotating, AC-generating assembly having a solid, electrically insulated, elongate cylindrical member;
   a first 360° electrically conductive rotor coaxially disposed on the cylindrical member proximate a top end portion of the cylindrical member;
   a second 360° electrically conductive rotor coaxially disposed on the cylindrical member proximate a bottom end portion of the cylindrical member;
   a plurality of arcuately edged, electrically conductive cams extending radially from portions of the cylindrical member at predetermined angular subintervals of a 360° rotation of the cylindrical member, a first predetermined sequence of the cams being electrically connected to the first electrically conductive rotor and a second predetermined sequence of the cams being electrically connected to the second electrically conductive rotor;
   a plurality of electrical brush conductors disposed around the rotating assembly and arranged for periodic sliding electromechanical contact against the electrically conductive cams;
   a plurality of DC input voltages, each of the DC input voltages being connected to a corresponding pattern of the brush conductors;
   a first load-connecting brush riding in continuous contact with the first 360° electrically conductive rotor;
   a second load-connecting brush riding in continuous contact with the second 360° electrically conductive rotor, the load-connecting brushes delivering a sequence of output voltages to a load, rotation of the assembly causing the remaining brushes to intermittently contact the arcuately edged electrically conductive cams in a patterned sequence sequentially adding the DC input voltages for distribution to the load over the first 180° of rotation, and sequentially subtracting the DC input voltages for distribution to the load over the second 180° of rotation, thereby distributing an Alternating Current output voltage to the load over the 360° of rotation of the rotary assembly.

2. The cam-controlled electromechanical rotary power inverter according to claim 1, further comprising a plurality of additional brushes and cams arranged in a pattern repeating every 120° around and on said rotary assembly to provide a 3-phase AC voltage output to the electrical load.

3. The cam-controlled electromechanical rotary power inverter according to claim 1, further comprising a drive gear coaxially disposed on an end portion of said elongate cylindrical member, the drive gear being adapted for engaging a corresponding gear of a prime mover so that the prime mover causes said rotating assembly to rotate and generate AC voltage.

* * * * *